United States Patent
George et al.

(10) Patent No.: US 11,128,724 B1
(45) Date of Patent: Sep. 21, 2021

(54) REAL-TIME INTERACTIVE EVENT ANALYTICS

(71) Applicant: Adobe Inc., San Jose, CA (US)

(72) Inventors: William Brandon George, Pleasant Grove, UT (US); Trevor Paulsen, Lehi, UT (US); Joshua Butikofer, Lehi, UT (US); Alexandra Strawn, Salt Lake City, UT (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/813,183

(22) Filed: Mar. 9, 2020

(51) Int. Cl.
*G06F 15/16* (2006.01)
*G06F 9/54* (2006.01)
*H04L 29/06* (2006.01)
*H04L 29/08* (2006.01)
*G06N 20/00* (2019.01)

(52) U.S. Cl.
CPC .............. *H04L 67/22* (2013.01); *G06N 20/00* (2019.01); *H04L 67/125* (2013.01); *H04L 67/146* (2013.01)

(58) Field of Classification Search
CPC ............ G06Q 30/0201; G06Q 30/0255; G06F 16/90335; H04L 67/22; H04L 67/125; H04L 67/146; G06N 20/00
USPC ........................................................ 709/224
See application file for complete search history.

(56) References Cited

U.S. PATENT DOCUMENTS

| | | | |
|---|---|---|---|
| 9,558,245 B1 * | 1/2017 | Gao | G06F 16/2465 |
| 10,459,954 B1 * | 10/2019 | Walters | G06F 17/15 |
| 10,545,975 B1 * | 1/2020 | Mahdy | G06F 16/25 |
| 10,902,322 B2 * | 1/2021 | Sodhani | G06N 20/10 |
| 2005/0262240 A1 * | 11/2005 | Drees | G06F 11/3495 709/224 |
| 2007/0219984 A1 * | 9/2007 | Aravamudan | G06F 16/248 |
| 2008/0177562 A1 * | 7/2008 | Dias | G06F 16/9535 705/1.1 |

(Continued)

OTHER PUBLICATIONS

T. Groß, R. Dirauf and F. Freiling, "Systematic Analysis of Browser History Evidence," 2020 13th International Conference on Systematic Approaches to Digital Forensic Engineering (SADFE), 2020, pp. 1-12, doi: 10.1109/SADFE51007.2020.00010. (Year: 2020).*

*Primary Examiner* — Hamza N Algibhah
(74) *Attorney, Agent, or Firm* — Kilpatrick Townsend & Stockton LLP

(57) ABSTRACT

This disclosure involves performing event analytics on-the-fly based on user input to an analysis interface. An event analytics system correlates a plurality of event datasets to include a common visitor identifier. The system causes display, via the analysis interface, of information about the plurality of event datasets. The system receives, via the analysis interface, user selection of one or more event datasets, of the plurality of event datasets. Based on the selected one or more event datasets, the system generates a combined event dataset. The event analytics system receives, via the analysis interface, user input specifying information requested about the combined event dataset. The system obtains the requested information about the combined event dataset. The system causes display, via the analysis interface, of a visualization of the obtained information, wherein the visualization is based on event data from the combined event dataset in chronological order.

20 Claims, 11 Drawing Sheets

(56) References Cited

U.S. PATENT DOCUMENTS

| | | | | |
|---|---|---|---|---|
| 2011/0246460 A1* | 10/2011 | Hsieh | ................. | G06Q 30/02 707/736 |
| 2011/0246816 A1* | 10/2011 | Hsieh | ................. | H04L 67/1042 714/4.12 |
| 2012/0010920 A1* | 1/2012 | Yuan | ................. | G06Q 30/0201 705/7.29 |
| 2012/0017165 A1* | 1/2012 | Gardner | ................. | H04L 41/22 715/771 |
| 2013/0006904 A1* | 1/2013 | Horvitz | ................. | G06N 20/00 706/46 |
| 2014/0258307 A1* | 9/2014 | West | ................. | G06F 16/2474 707/746 |
| 2015/0370863 A1* | 12/2015 | Modarresi | ................. | G06F 16/2462 707/722 |
| 2016/0140587 A1* | 5/2016 | Wilson | ................. | G06Q 30/0269 705/7.33 |
| 2016/0165388 A1* | 6/2016 | Turner | ................. | H04L 67/26 455/456.1 |
| 2016/0335405 A1* | 11/2016 | Perunov | ................. | G06F 19/00 |
| 2017/0046872 A1* | 2/2017 | Geselowitz | ................. | G06F 3/04845 |
| 2017/0262505 A1* | 9/2017 | Xie | ................. | G06F 16/2456 |
| 2017/0364570 A1* | 12/2017 | Jacob | ................. | G06F 16/9024 |
| 2019/0272387 A1* | 9/2019 | Gkoulalas-Divanis | ................. | G06F 21/6254 |
| 2020/0117674 A1* | 4/2020 | Murphey | ................. | G06F 16/24565 |
| 2020/0183991 A1* | 6/2020 | Zimmer | ................. | G06F 8/38 |
| 2020/0242110 A1* | 7/2020 | Halstead | ................. | G06F 16/254 |
| 2020/0250164 A1* | 8/2020 | Halstead | ................. | G06F 16/21 |
| 2020/0273064 A1* | 8/2020 | Palaic | ................. | G06N 20/00 |
| 2020/0278977 A1* | 9/2020 | Halstead | ................. | G06F 16/248 |
| 2020/0311100 A1* | 10/2020 | Rupela | ................. | G06F 16/283 |
| 2020/0311136 A1* | 10/2020 | Jun | ................. | G06N 3/0454 |
| 2020/0311161 A1* | 10/2020 | Messenger | ................. | G06F 16/9014 |
| 2020/0349480 A1* | 11/2020 | Panday | ................. | G06F 16/2465 |
| 2020/0401580 A1* | 12/2020 | Fitzpatrick | ................. | G06F 16/248 |

\* cited by examiner

Create Connection

Settings  Configure Correction                        Cancel  Back  Save

Select Datasets

🔍 Search Datasets 203

| | | | | | ● Remove All | Analytics Production |
|---|---|---|---|---|---|---|
| | DATASET | | SOURCE | SCHEMA | | ● Remove |
| ☐ DATASET 202 | AnalyticsReportSuite1 224 | | Schema | Custom | ⊗ | |
| ☐ Analytics Report Suite I + | CallCenterData 226 | | Schema | Custom | ⊗ | Dashboard Type 212 |
| ☐ CRM Data + | | | | | | Lookup 218 |
| ☐ Analytics Production + | 228 | Columns (II) 240 | | | | Key * 260 |
| ☐ Ad Impression Data + | Destination Preview | | | | | Visitor ID ∨ |
| ☐ Call Center Data + | | | 254 | 256 | Available Rows 28 | |
| ☐ Email Data + | COLUMNS 252 | | COLUMN TYPE | COMPONENT TYPE | DATASET 258 | |
| ☐ Survey Data + | 1 | VisitorID | PersonID | Metric | ● AnalyticsReportSuite I | |
| ☐ Mobile App Report Suite + | 2 | DateTime | Timestamp | Metric | ● AnalyticsReportSuite I | |
| ☐ Point of Sales Data + | 3 | MarketingChannel | — | Metric | ● AnalyticsReportSuite I | |
| ☐ Taciding Code Lookup Data + | 4 | ProductID | Key | Metric | ● AnalyticsReportSuite I  ○ CallCenter | |
| ☐ CRM Data 2 + | 5 | Orders | — | Metric | ● AnalyticsReportSuite I | |
| ☐ Product SKU Lookup Data + | 6 | Region | | Metric | ● AnalyticsReportSuite I | |
| ☐ Product SKU Profile Data + | | | | | | |

FIG. 2C

Adobe Analytics  Workspace  Connections  Data Views  Components  Labs

Data Views > My Data View   Close  Back  Save

Settings  Add Components

Connection
My Multi-Channel Connection

Search Components  304

⊕ DIMENSIONS  306

| Ad_cookie_id |
| Ad_creative |
| Ad_size |
| Ad_type |
| Call_reason |
| Checkout_type |
| Cookie_id |
| Customer_id |

Show All >

METRICS  308

| Ad_clicks |

0 Components Added (Max 1,000)

Search Datasets  304

302 Add Components to Data View
Drag and drop components to curate Data View 303  Add All Components

REAL-TIME INTERACTIVE EVENT ANALYTICS

TECHNICAL FIELD

This disclosure generally relates to data analytics. More specifically, but not by way of limitation, this disclosure relates to real-time interactive event analytics.

BACKGROUND

Collecting and analyzing visitor data is increasingly popular. A major area of focus is web analytics, which deals with the analysis of data created by website usage. For instance, web analytics can be used to mine visitor traffic data. A variety of visitor traffic data is measured such as what browser is being used, what links on a given web page were selected, whether a product was purchased, and so forth. There are number of web analytics tools presently available that capture and analyze data related to website usage.

Some existing systems "stitch" or "blend" data to tie web traffic data together with other web traffic data. Typically, data is stitched using an "off-the-shelf" product that provides little visibility. Some existing systems provide information about web traffic data, or data collected from other channels such as a customer relationship management system. However, data across different channels tends to be segregated off in different databases, often using different formatting and schema. It is very difficult to gain insight into how cross-channel visitor interactions play out. An attempt to do so may involve piecing together multiple disparate data sets and technologies. This may require specialized code to be prepared to query the multiple data sets, and executing such code tends to be time consuming and error-prone. While one group may use the results of such analysis, the code is generally prepared by specialized engineers. Thus, the group seeking results may need to go back and forth with various engineers before actually being able to obtain results, which can cause substantial delays in obtaining the results.

Accordingly, there is a need to facilitate analysis of cross-channel event data quickly and without the need to prepare specialized code to obtain information.

SUMMARY

Certain embodiments involve real-time interactive event analytics. An event analytics system can perform event analytics on-the-fly based on user input to an analysis interface. For example, the event analytics system correlates a plurality of event datasets to include a common visitor identifier. The event analytics system causes display, via the analysis interface, of information about the plurality of event datasets. The event analytics system receives, via the analysis interface, user selection of one or more event datasets, of the plurality of event datasets. Based on the selected one or more event datasets, the event analytics system generates a combined event dataset. The event analytics system receives, via the analysis interface, user input specifying information requested about the combined event dataset. The event analytics system obtains the requested information about the combined event dataset. The event analytics system causes display, via the analysis interface, of a visualization of the obtained information, wherein the visualization is based on event data from the combined event dataset in chronological order. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIGS. 2A-2C depict examples of an analysis interface for creating a connection between event datasets, according to certain embodiments of the present disclosure.

FIGS. 3A-3C depict examples of an analysis interface for configuring views of event datasets, according to certain embodiments of the present disclosure.

FIG. 4 depicts an example of an analysis interface displaying overview data analytics results, according to certain embodiments of the present disclosure.

DETAILED DESCRIPTION

Figure 1:
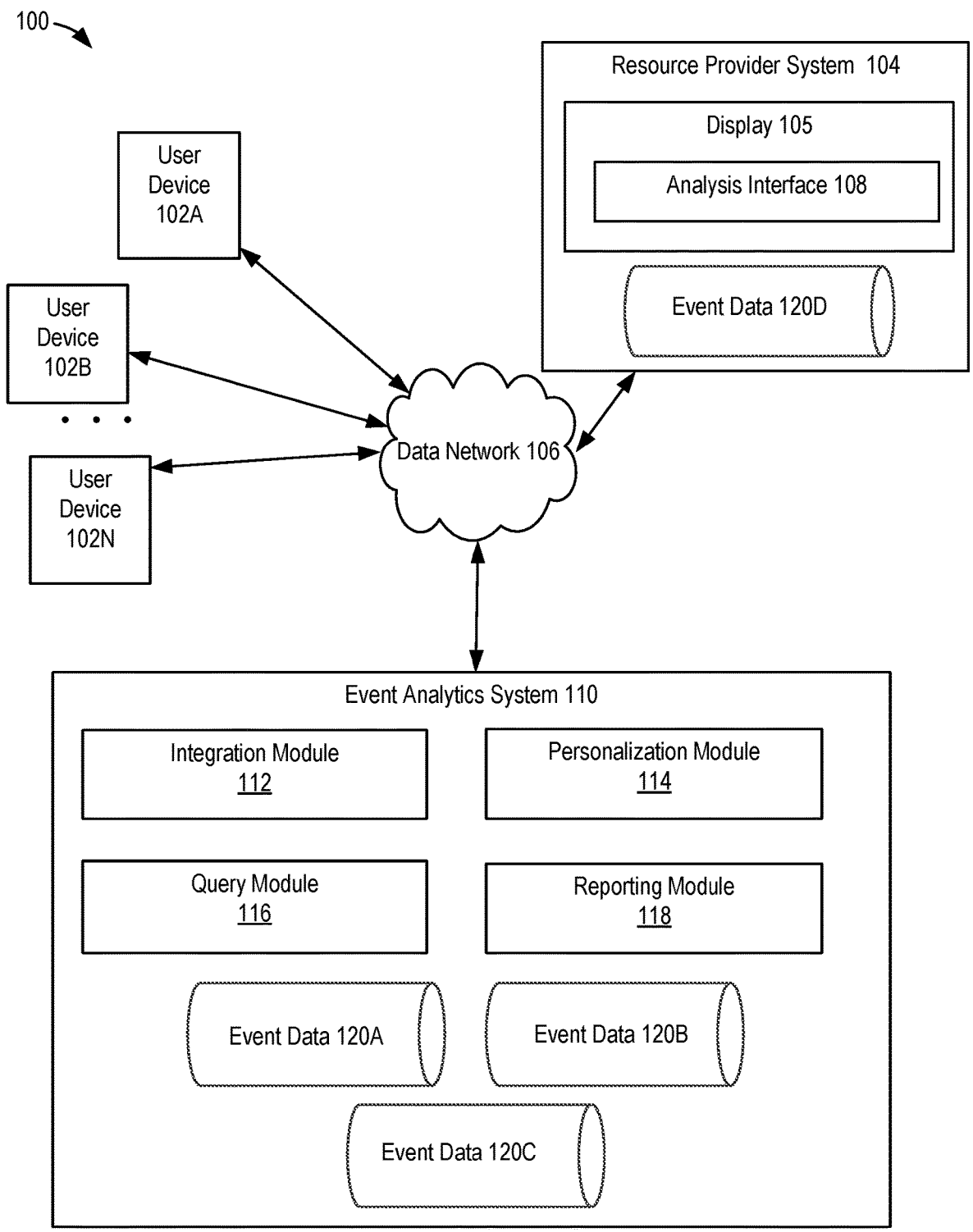
FIG. 1 depicts an example of a network environment for real-time interactive event analytics, according to certain embodiments of the present disclosure.

The present disclosure includes systems and methods for real-time event analytics. As explained above, conventional solutions tend to approach different event datasets in a piecemeal fashion. Extracting and integrating information from disparate event datasets can be extremely difficult and time-consuming. Certain embodiments described herein analyze and report on disparate event datasets using an analysis interface to allow a user to tailor the analysis of event data. This can provide customized results substantially in real-time, in contrast to the lengthy process traditionally used. As used herein, "real-time" is used to describe operations performed automatically responsive to input (e.g., in contrast to prior systems that require manual data retrieval and scripting of specialized queries, the techniques described herein manipulate data on the fly based on simple user input). The event analytics system correlates a plurality of event datasets to include a common visitor identifier. The event analytics system causes display, via an analysis interface, of information about the plurality of event datasets. The event analytics system receives, via the analysis interface, user selection of one or more event datasets, of the plurality of event datasets. Based on the selected one or more event datasets, the event analytics system generates a combined event dataset. The event analytics system receives, via the analysis interface, user input specifying information requested about the combined event dataset. The event analytics system obtains the requested information about the combined event dataset, and causes display, via the analysis interface, of a visualization of the obtained information, wherein the visualization is based on event data from the combined event dataset in chronological order. This can represent a journey of one or more visitors in a set of cross-channel interactions.

The following non-limiting example is provided to introduce certain embodiments. In this example, an event analytics system includes one or more computing systems that execute an integration module, a personalization module, a query module, and a reporting module. The integration module retrieves and integrates dozens of event datasets. The event datasets correspond to data from various different channels such as web traffic data, in-store activity, live events, surveys, billboards, Internet of Things (IoT) sensors, and call-center interactions. The event analytics system integrates the different event datasets by automatically detecting schema, performing any needed format conversions, and stitching the event data by adding visitor identifiers to the event data. This results in a set of event datasets that are compatible with one another, with each event correlated with a visitor.

The event analytics system causes display, via an analysis interface, of information about the plurality of event datasets. The analysis interface is managed by the event analytics system, and displayed on a display component of a resource provider system. The resource provider is an entity such as a merchant that seeks to collect and/or analyze visitor data to inform future interactions with visitors. The analysis interface lists various different event datasets such as web data, call center data, IoT data, and in-store data.

The event analytics system receives, via the analysis interface, user selection of some of the displayed event datasets. A user, such as a resource provider administrator, may be interested in a subset of the event datasets listed. For example, the user checks checkboxes next to the event datasets web data and IoT data. Based on the selected event datasets, the event analytics system generates a combined event dataset. The event analytics system combines the web data and the IoT data by building a data table including fields from each event dataset.

The event analytics system receives, via the analysis interface, user input specifying information requested about the combined event dataset. The user applies filters to drill down into data within a particular timeframe, and selects a model to use in analyzing the event data. The event analytics system obtains the requested information about the combined event dataset by generating and applying a query to identify event data from the web data and the IoT data within a particular time period using the selected model to analyze the data. The event analytics system causes display, via the analysis interface, of a visualization of the obtained information. The visualization is based on event data from the combined event dataset in chronological order. The visualization shows a set of events across channels—a visitor made a shopping list using an IoT device, navigated to a web page to search items on the shopping list, and eventually purchased an item from the shopping list. This information is displayed in a user-friendly manner based on intuitive input provided by a user to the analysis interface, democratizing the data science process.

As used herein, the term "event" is used to refer to an occurrence that may be associated with a visitor. Events may include detection of a visitor interaction with a website or application. For example, a visitor may click on a link, enter information, open an email, send an email, and so forth. Events may include in-person interactions. For example, a visitor may make an in-store purchase or return, or speak face-to-face with a representative. Events may include remote interactions with a representative such as a conversation with a call-center operator or a dialogue with a chatbot.

As used herein, the term "event data" is used to refer to data associated with an event. Event data may include a timestamp, device identifier, visitor identifier, website information, product information, an email address, a phone number, and/or any other suitable information.

As used herein, the term "device identifier" is used to refer to an identifier associated with a particular device. An example of a device identifier is a cookie identifier, which is a unique identifier used to recognize a browser. Examples of device identifiers include an Experience Cloud Identifier (ECID), an Audience Manager unique user identifier (AAMUUID), and an Adobe Analytics identifier (AAID). Another example of a device identifier is a universally unique identifier (UUID). Another example of a device identifier is an internet protocol (IP) address.

As used herein, the term "visitor identifier" is used to refer to an identifier of a visitor, such as a customer or potential customer. A visitor identifier may include a string of characters. Examples of visitor identifiers include a login identifier, a customer relationship management (CRM) identifier, an email address, a phone number, and a legal name.

As used herein, the term "visitor stitching" is used to refer to a process by which several distinct events (e.g., visits to a website) associated with the same person are combined or otherwise associated with one another for analytical purposes. For instance, if a particular person visits a website multiple times using the same browser, each of those visits can be associated with the same person using cookies stored by the browser. More complex forms of visitor stitching may correlate events associated with a visitor across multiple browsers and devices. The analytics associated with a given person can then be converted into actionable intelligence, for example, in the context of a marketing strategy.

As used herein, the term "attribution" is used to refer to a process of allocating credit among interactions for a particular outcome, such as for a purchase. Attribution can therefore be understood as the process of measuring, quantifying, and assigning credit to a plurality of interactions in a way that reflects the influence that each interaction has on a particular outcome. Attribution may be accomplished using models such as the last-touch attribution (LTA) model, which attributes an observed behavior to the marketer-consumer interaction—also referred to as a "touch"—that immediately preceded the observed behavior. As another example, multi-touch attribution (MTA) models acknowledge that multiple interactions can each share a fraction of the credit for a particular outcome.

As used herein, the term "segment" is used to refer to a list of visitors and/or devices that qualify for a set of rules defining a particular collection of one or more traits. A set of traits in a segment may relate to a set of visitors who share common attributes. Examples of a segment include a set of traits corresponding to visitors who viewed a particular advertisement on a particular webpage over a specified time range, a set of traits related to visitors who viewed articles on a subject between a specified minimum amount of time and a specified maximum amount of time, a set of traits related to tracked entities who purchased a particular product, and so forth. Traits may be combined in a segment using any suitable combination of Boolean operators (e.g., AND, OR, or NOT). Data describing a segment is stored using any suitable storage object (e.g., a database of the various traits for the segment).

As used herein, the term "segmentation" is used to refer to the computer-implemented process of determining a segment.

Certain embodiments described herein facilitate using event data from different datasets to analyze the behavior of a visitor. In some embodiments, the visitor behaviors are used to take appropriate action in response to a certain event (e.g., transmitting a sale email to a visitor after prior visitor behavior indicates the visitor has made a purchase after receiving a similar email). The use of real-time interactive techniques for event analytics facilitates efficiently deriving results from disparate datasets, which can provide more accurate and fast results.

Example Operating Environment for Real-Time Interactive Event Analytics

Referring now to the drawings, FIG. 1 depicts an example of a network environment 100 for real-time interactive event analytics, according to certain embodiments of the present disclosure. In the example depicted in FIG. 1, various user devices 102A, 102B, . . . 102N access a resource provider system 104 via a data network 106. An event analytics system 110 analyzes events associated with the user devices 102A-102N using an integration module 112, personalization module 114, query module 116, and reporting module 118 (or other suitable program code) for performing one or more functions used in real-time interactive event analytics based on event data 120A, 120B, 120C, and 120D. A user interacts with an analysis interface 108 via a display 105 of a resource provider system 104.

Event data 120A-120D can be used for analyzing behavior of an end user, such as a consumer (hereinafter, a "visitor"), based on events associated with the visitor. In a non-limiting example, event data 120A-120D includes records such as browser history (e.g., based on detecting a visitor clicking on a link, adding an item to a cart, purchasing an item, navigating to a page, and so forth). Event data 120A-120D may further be associated with email exchanges, transcripts of phone calls, in-store transactions such as a purchase or return, or interactions with an IoT device. For example, event data 120A may correspond to a first dataset associated with browser data. Event data 120B may correspond to a second dataset associated with call center data. Event data 120C may correspond to a third dataset associated with IoT data. Event data 120D may correspond to a third dataset associated with customer relationship management (CRM) data. Some event data (e.g., 120A, 120B, and 120C) may be stored by the event analytics system 110 (e.g., to a local or cloud-based database). Some event data (e.g., 120D) may be stored by the resource provider system 104 (e.g., and streamed to the event analytics system 110 for analysis and reporting). The event analytics system 110 uses the event data 120A-120D for analyzing correlated events, such as the behavior of a particular visitor over time. The event analytics system 110 correlates the events using an integration module 112.

Some embodiments of the network environment 100 include user devices 102A-102N. Examples of a user device include, but are not limited to, a personal computer, a tablet computer, a desktop computer, a processing unit, any combination of these devices, or any other suitable device having one or more processors. A user of the user device (e.g., a visitor operating user device 102A, 102B, or 102N) interacts with the resource provider system 104, directly or indirectly, via the data network 106.

The resource provider system 104 includes one or more computers controlled by a resource provider. A resource provider may be a merchant, transit provider, content provider, or any entity that can utilize event data. The resource provider system 104 may include a server computer that serves data for a website accessed by user devices 102A-102N. The resource provider system 104 may include one or more point of sale (POS) terminals that process in-store purchases. The resource provider system 104 may include call center computers that collect and store records of calls between visitors and customer service representatives. The resource provider system 104 may include one or more server computers that analyze and store data associated with visitors (e.g., a customer relationship management (CRM) system). Alternatively, or additionally, the resource provider system 104 may interact with a third-party CRM service. By way of such components, the resource provider system 104 may generate, collect, and/or store event data. The resource provider system 104 may further include one or more displays (e.g., monitors, touchscreens, and the like) for displaying event data or derivatives thereof.

The resource provider system 104 includes a display 105 and an analysis interface 108. The display 105 may be a screen such as a monitor or touch screen configured to display information. The analysis interface 108 displays information about event datasets via the display 105. The analysis interface 108 is configured to receive user input (e.g., from an administrator associated with a resource provider) to select event datasets, and to configure parameters for displaying and obtaining information about the event datasets. For example, the analysis interface 108 may include elements to allow users to select parameters from a list, drag and drop parameters, and so forth, as illustrated in FIGS. 2A-5.

Each of the user devices 102A-102N is communicatively coupled to the resource provider system 104 and the event analytics system 110 via the data network 106. Examples of the data network 106 include, but are not limited to, internet, local area network ("LAN"), wireless area network, wired area network, wide area network, and the like.

Figure 7:
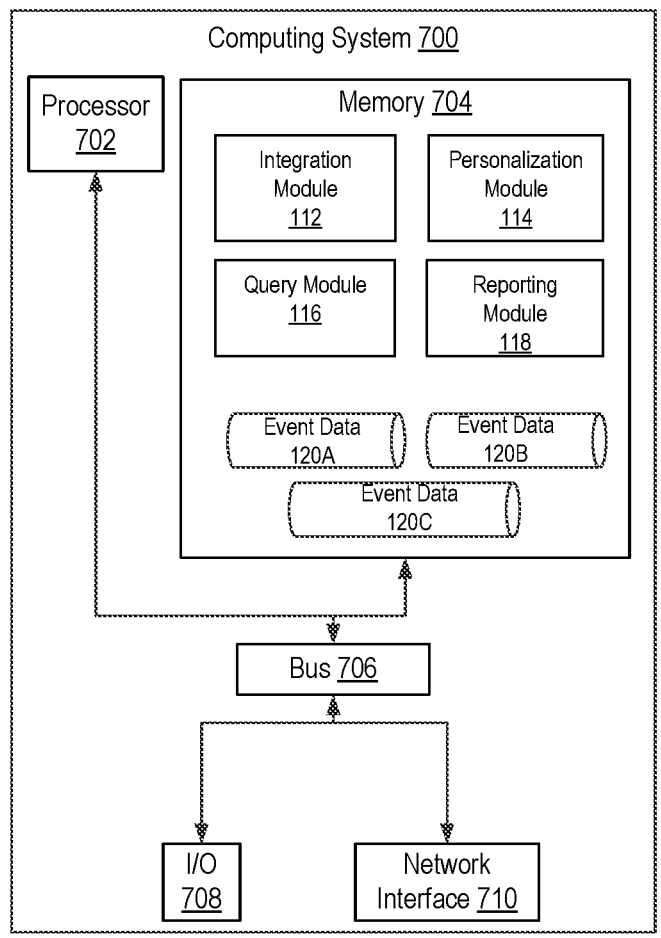
FIG. 7 depicts an example of a computing system that performs certain operations described herein, according to certain embodiments of the present disclosure.

The integration module 112 includes code configured to, in cooperation with a processor (e.g., as shown in FIG. 7), gather, generate, store, and update event data. The integration module 112 may collect event data 120 from user devices 102A-102N and/or resource provider system 104. The integration module 112 may further generate event data. For example, the integration module 112 may generate a timestamp based on a time that event data was retrieved from a user device.

The integration module 112 may analyze event data to identify common elements (e.g., a device identifier). The integration module 112 may correlate related event data from different event datasets based on such common elements. For example, the integration module 112 may organize event data into a data table, correlate related event data using pointers, or any other suitable means of organizing the event data. The integration module 112 may further perform visitor stitching to associate event data with a visitor identifier.

The personalization module 114 includes code configured to, in cooperation with a processor (e.g., as shown in FIG. 7), personalize how event data is correlated and analyzed based on user input. The personalization module 114 may receive user input to personalize information to be displayed and analyzed ("data views"). The personalization module 114 may perform operations on one or more event datasets responsive to the user input. For example, user input may be received to filter event data, or rename data fields. The personalization module may apply corresponding filters or name changes to the event data.

The query module 116 includes code configured to, in cooperation with a processor (e.g., as shown in FIG. 7), formulate and execute a query based on user input. The query module 116 may receive user input corresponding to a user request for information. As examples, the input may be in the form of dragging and dropping fields for further analysis, selecting items for attribution operations, or entering a question. The query module 116 may formulate a query (e.g., a structured query language (SQL) or Hadoop query) based on such input, and execute the query to obtain results. For example, query module 116 may formulate and execute an SQL query to obtain information indicating how many visitors in Canada made purchases online as a next event after interacting with a call center operator.

Figure 4:
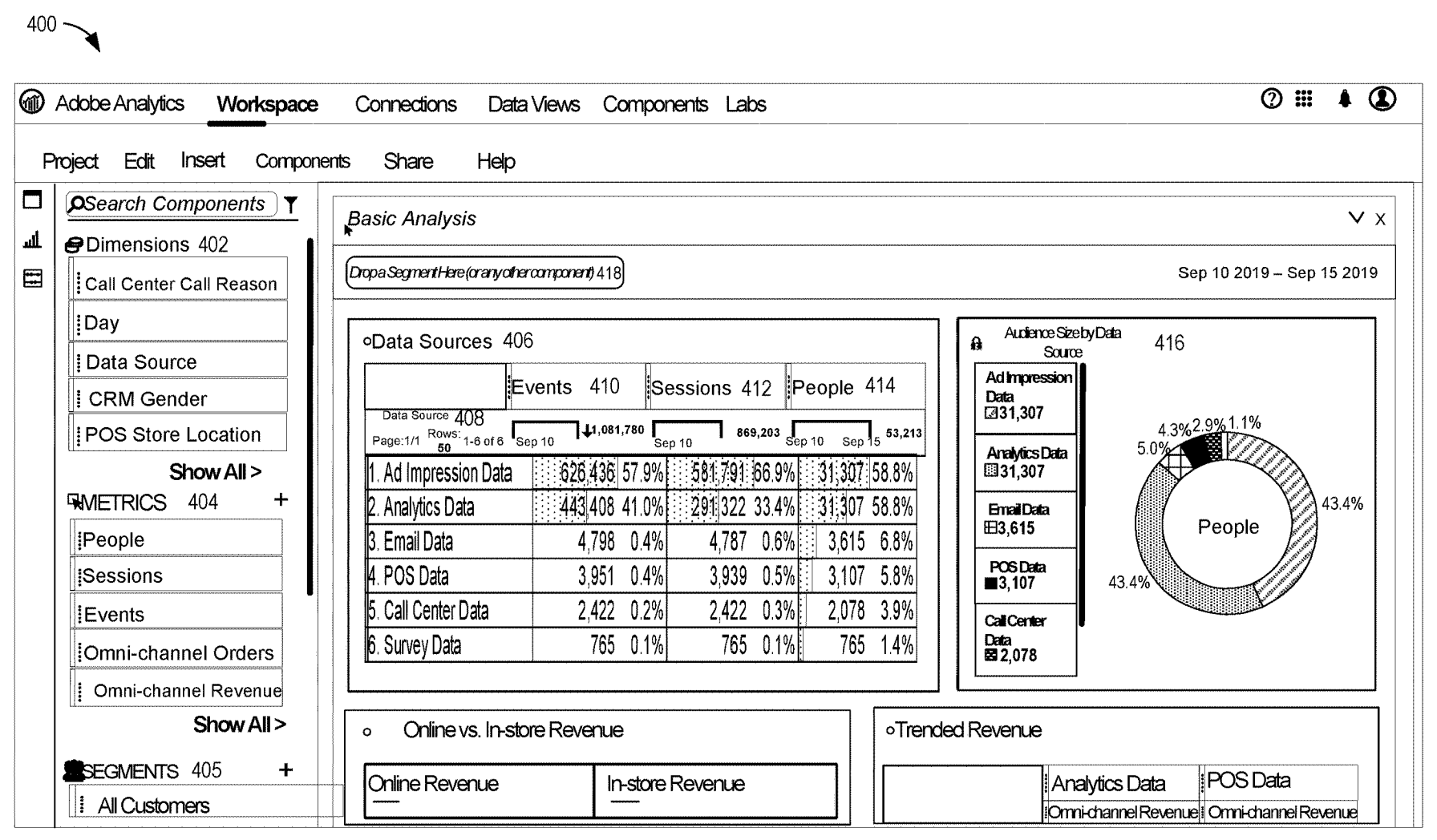
Figure 5:
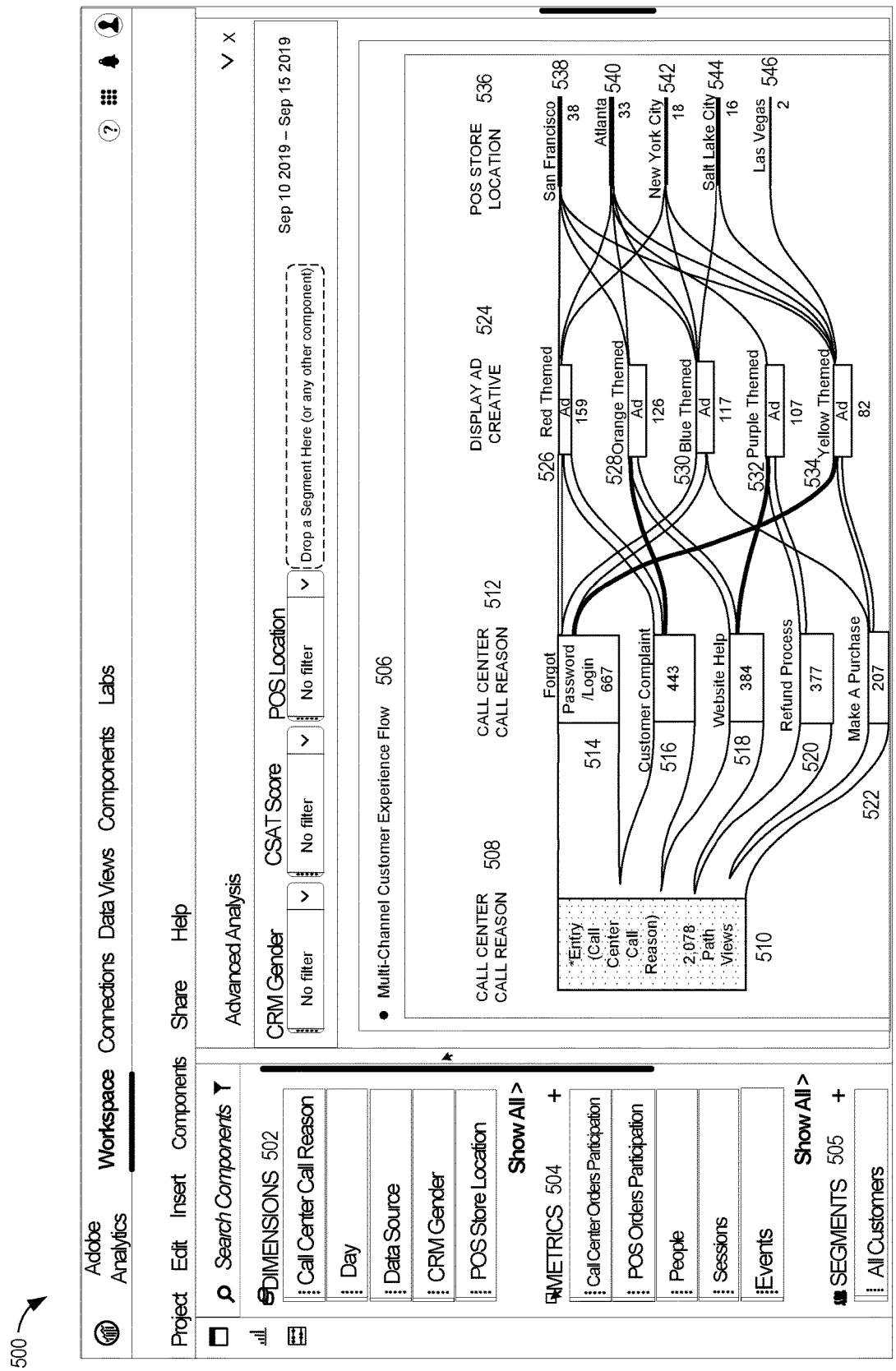
FIG. 5 an example of an analysis interface displaying advanced data analytics results, according to certain embodiments of the present disclosure.

The reporting module 118 includes code configured to, in cooperation with a processor (e.g., as shown in FIG. 7), generate and cause display of visualizations to convey information to a user. The reporting module 118 may generate visualizations such as graphs and charts, as illustrated in FIGS. 4 and 5. Such visualizations may be generated based on information obtained by one or more of the integration module 112, personalization module 114, or query module 116. The reporting module 118 may transmit information to resource provider system 104 to cause display of such visualizations visa the analysis interface 108.

Figure 2A:
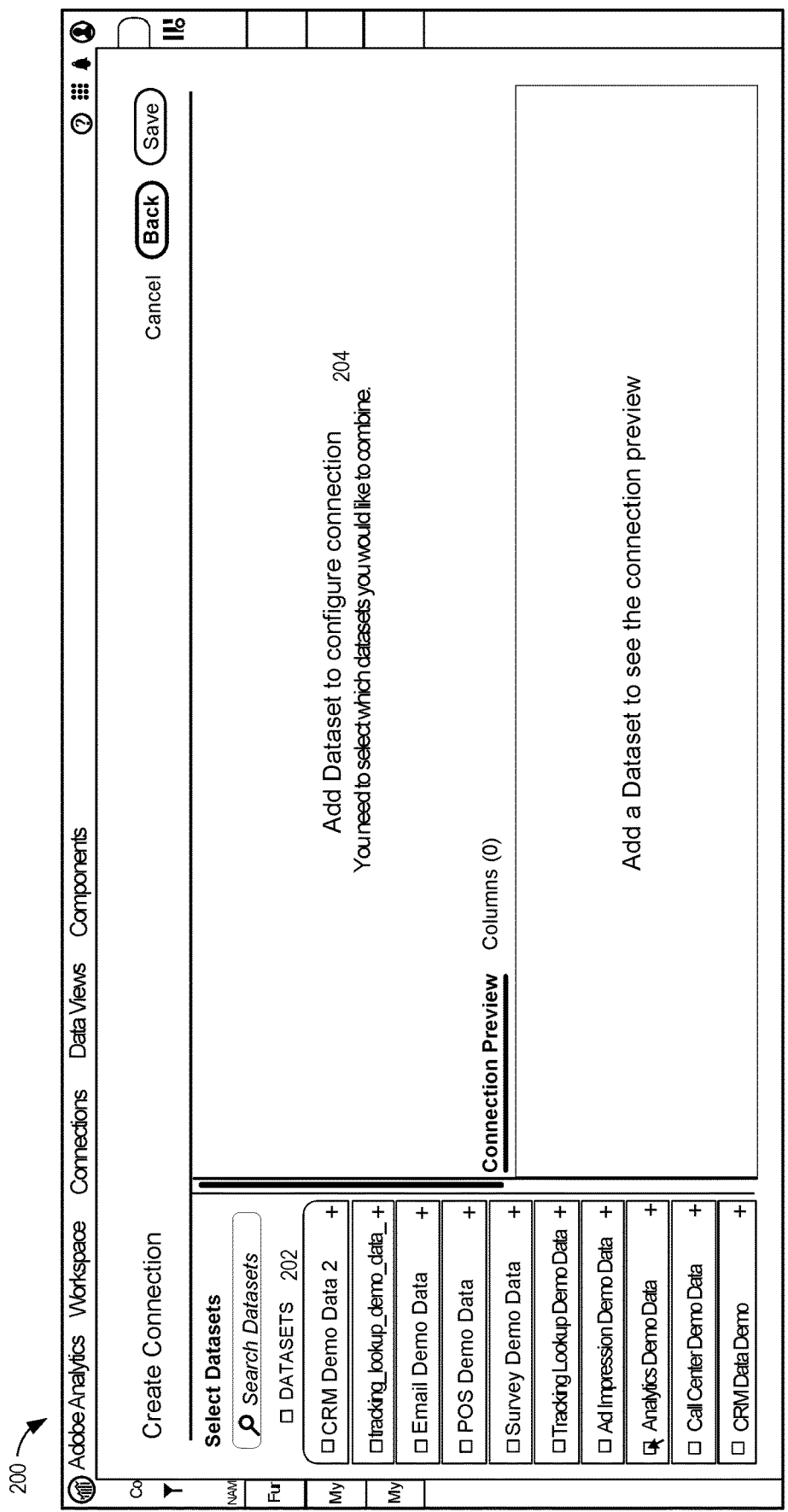
Figure 2B:
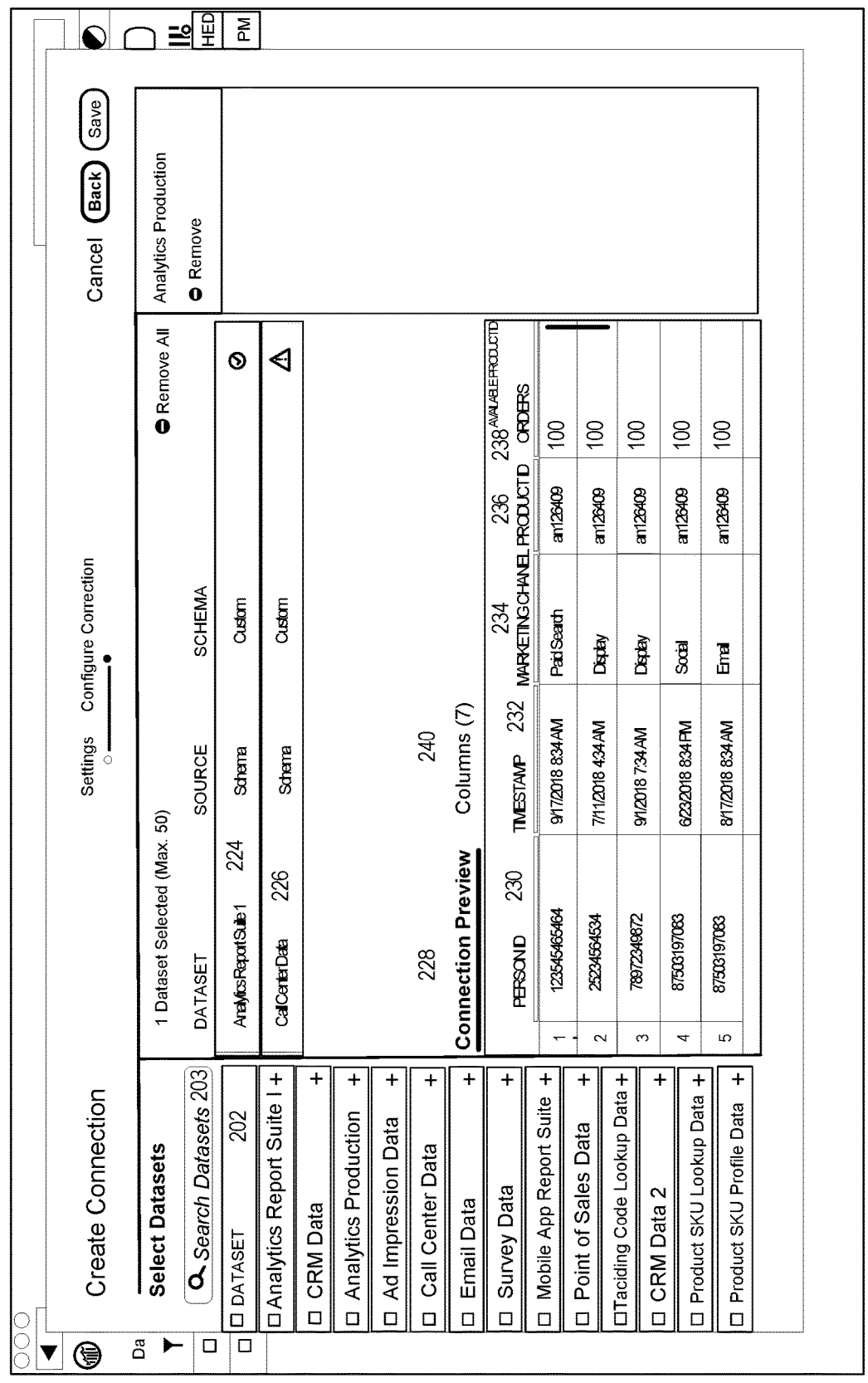

FIGS. 2A-2C depict examples of an analysis interface for creating a connection between event datasets, according to certain embodiments of the present disclosure. FIG. 2A illustrates a screenshot of an analysis interface view 200 for selecting datasets 202 for analysis. Such a grouping of event datasets is referred to as a "connection." A set of datasets 202 is displayed on the left hand side, along with check boxes for selecting corresponding datasets 202. A message 204 indicates to add datasets—"Add Datasets to configure connection."

Upon receiving user input selecting datasets 202, the interface transitions to analysis interface view 220, as shown in FIG. 2B. The left rail shows a list of additional datasets that may be selected 202, along with check boxes for accepting user input to select each dataset. A search bar 203 is provided above the dataset list 202 to facilitate searching for a particular dataset.

The analysis interface view 220 shows the datasets that have been included in the connection—Analytics Report Suite I 224 and Call Center Data 226. Below the names of datasets 224 and 226 are two tabs, destination preview 228 and columns 240. The destination preview tab 228 shows a preview of the selected dataset, Analytics Report Suite I 224. The dataset includes the columns: person ID 230, timestamp 232, marketing channel 234, product ID 236, and orders 238. Multiple datasets (e.g., Analytics Report Suite I 224 and Call Center Data 226) are selected to be integrated into the same connection. The destination preview 228 below shows which fields will be merged into a single metric or dimension, and which fields will be their own metric or dimension. This is similar to a union of the two event datasets. The combined event datasets can enable reporting of, for example, one unified "revenue" metric that contains revenue from online, call center, and POS for example.

FIG. 2C illustrates an analysis interface view 250 with the columns tab 240 activated. Responsive to user selection of the columns tab 240, the analysis interface may transition from analysis interface view 220 to analysis interface view 250.

The columns tab 240 indicates elements of a combined dataset, generated based on the datasets 224 and 226. Columns 252 indicates the columns to be included—Visitor ID, Date Time, Marketing Channel, Product ID, and so forth. A column type 254, component type 256, and dataset 258 for each of the columns 252 is also shown. As indicated in the fourth row, Product ID includes event data from both the Analytics Report Suite I dataset 224 and the Call Center dataset 226.

The analysis interface view 250 further includes a right sidebar for accepting user input to configure how the event datasets are combined. User input can be accepted via key element 260 to configure a parameter for keying the data. This is useful because the event datasets can be linked based on a desired element such as a cookie identifier, cross device visitor identifier, or account identifier. As illustrated in FIG. 2C, visitor ID has been selected via key element 260.

The right sidebar of the analysis interface view 250 further shows a dataset type 212 of the selected dataset, call center data 226. The event analytics system can automatically determine a dataset type by analyzing dataset schema. The dataset type 212 is Lookup 218. Lookup datasets 218 may contain external data from corporate databases or lookup files (e.g., event data 120D as stored on resource provider system 104 of FIG. 1). Other dataset types which may be automatically determined by the event analytics system include profile datasets, which may include visitor attributes, which may be constant over time. Examples of such data include customer identifiers, cookie identifiers, contact information, and so forth.

Figure 3B:
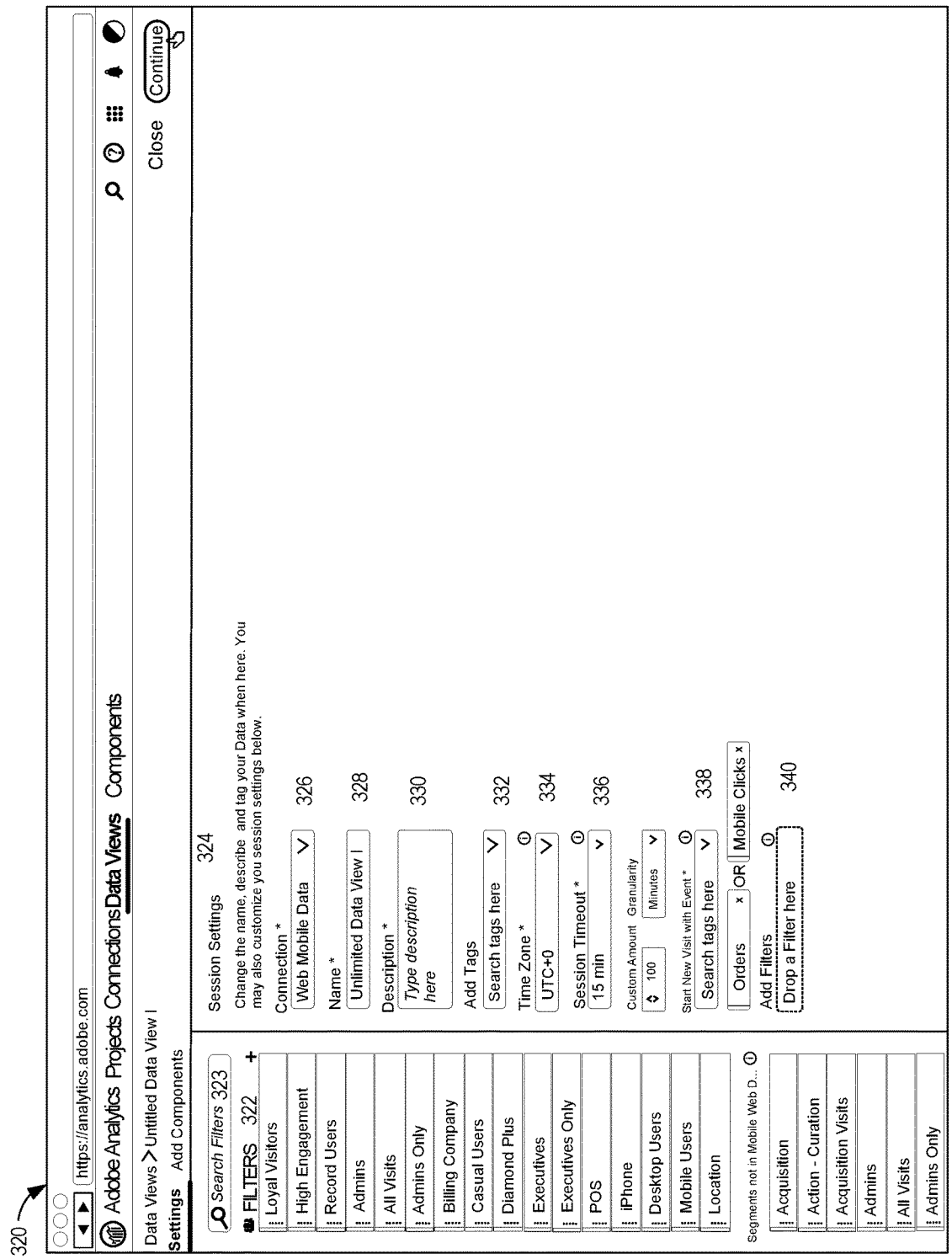
Figure 3C:
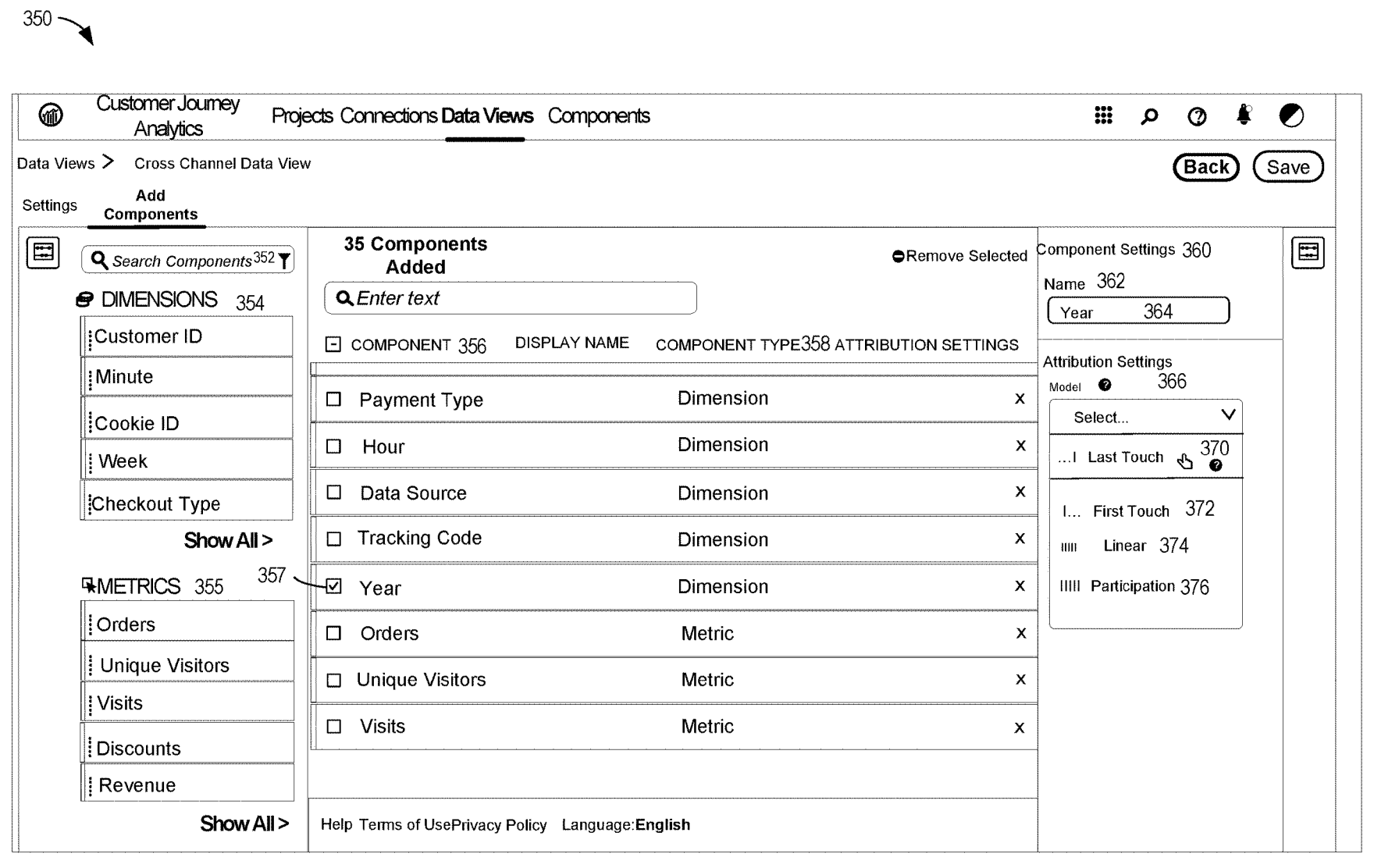

FIGS. 3A-3C depict examples of an analysis interface for configuring views of event datasets, according to certain embodiments of the present disclosure. FIG. 3A depicts an analysis interface view 300 for initiating adding components to a data view. The analysis interface view 300 includes a message 302, "Add Components to Data View," which prompts a user to drag and drop components to curate a data view. The analysis interface view 300 also includes a button 303 for accepting user input to add all components, and a search box 304 that a user can interact with to search within the available components.

The components are parameters of the event datasets, and include dimensions 306 and metrics 308, which are listed for selection in a left sidebar. Dimensions 306 are parameters that correspond to string values (e.g., visitor identifiers, names, and locations). Metrics 308 correspond to parameters with numerical values (e.g., timestamps, amounts, and so forth). For each dimension 306 and metric 308, user input may be accepted to set a corresponding default attribution model.

FIG. 3B depicts an analysis interface view 320 for configuring settings. The analysis interface view 320 includes a left bar of filters 322. The filters 322 are listed, and can be selected to filter the combined event dataset to particular categories of data, such as for loyal visitors, administrators, data from a desktop or mobile device, and so forth. A search bar 323 is provided to accept input to search from available filters.

The analysis interface view 320 includes interface elements for configuring session settings 324. A particular connection 326 may be selected from a drop-down menu of available connections, and that particular connection 326 is then configured via analysis interface view 320. A name of the connection 328 can be specified via a text entry field, as well as a description 330 of the connection. Tags 332 can be selected from a drop-down, as can a time zone 334. The interface view 320 further includes an interface elements for configuring session timeout 336. Session timeout 336 establishes when a session, or visit, ends, and another begins. A drop-down 338 is provided for specifying an event that establishes a new visit (e.g., when a visitor navigates to a page, clicks on a link in an email, and so forth). A filter selection element 340 is provided, which can accept user input dragging and dropping filters for application to the combined event dataset. Responsive to user selection of a "continue" button 342, the interface transitions from analysis interface view 320 to analysis interface view 350.

FIG. 3C depicts an analysis interface view 350 for configuring a data view. The analysis interface view 350 includes a list of dimensions 354 and a list of metrics 355 in a left sidebar. The analysis interface can accept user input selecting dimensions and metrics to add to the data view. A search box 352 is also provided, which can be used to search for a particular desired dimension or metric.

The analysis interface view 350 further includes a list of components 356. The components 356 include any dimensions or metrics added, which become components of the data view. For each listed component 356, the component type 358 (dimension or metric) is specified.

The analysis interface view 350 further includes a right sidebar for configuring component settings 360. A particular component may be selected. In this case, the component "year" has been selected, as indicated by the check box 357. The name of the selected component 362 is shown. An interface element 364 is provided, which may be used to modify the displayed name of a component.

The analysis interface view 350 further includes a drop-down 366 to select an attribution model to apply in analyzing the event data. As indicated in FIG. 3C, the drop-down has been activated, and lists several attribution models that may be selected: last touch 370, first touch 372, linear 374, and participation 376. The event analytics system may then apply the selected attribution model for analyzing the event data.

FIG. 4 depicts an example of an analysis interface view 400 displaying basic event data analytics results, according to certain embodiments of the present disclosure. The left sidebar of the analysis interface view 400 lists dimensions 402 and metrics 404, as described above with respect to FIGS. 3A-3C. The left sidebar further displays a list of segments 405, which a user may use to select segments of interest.

The analysis interface view 400 further includes a table 406 of data sources. The table 406 includes a column of data sources 408, which may correspond to event datasets such as Ad Impression Data, Analytics Data, Email Data, POS Data, Call Center Data, and Survey Data. The table 406 includes a column of events 410. This column indicates a number of events in each of the event datasets (e.g., 629,436 for Ad Impression Data, 3,951 for POS Data, and so forth). Beside each number of events is a percentage of total events in the combined dataset that correspond to events from an individual event dataset. Sessions 412 indicates a number of sessions in each event dataset, and people 414 indicates a number of different visitors in each event dataset. Similar to the events column 410, the sessions 412 and people 414 column lists a number as well as a percentage of the combined event dataset, for each respective data source 408.

The analysis interface view 400 further includes a chart 416 of audience size by data source. The chart 416 illustrates visitors per data source (e.g., event datasets such as ad impression data, analytics data, and so forth) in pie-chart form. Additional analytics reporting tables and charts may be provided responsive to user input scrolling down in analysis interface view 400.

The analysis interface view 400 further can be modified responsive to user input via drag-and-drop field 418. The drag-and-drop field can receive a segment or other component via user input (e.g., dragging-and-dropping a segment into field 418), to provide information about that segment.

FIG. 5 an example of an analysis interface view 500 displaying advanced event data analytics results, according to certain embodiments of the present disclosure. The left sidebar of the analysis interface view 500 lists dimensions 502, metrics 504, and segments 505.

The analysis interface view 500 includes a multi-channel customer experience flow 506, which shows customer journeys across different channels. For example, a visitor may call into a call center for a particular reason, view a particular advertisement, and purchase an item at a particular store. The multi-channel customer experience flow 506 shows this journey as a set of events in chronological order. The data for the analysis interface view 500 may be based on the user-configured parameters established using interfaces as shown in FIGS. 2A-4.

The customer experience flow 506 begins with entry 510, or a first detected event. In this case, the entry 510 is call center call 508. The number of events, 2,078, is displayed. Next, the customer experience flow splits to different call center reasons 512—forgot password 514 represents 667 events, customer complaint 516 represents 443 events, website help 518 represents 384 events, refund process 520 represents 377 events, and make a purchase 522 represents 207 events. The next event in the multi-channel customer experience flow is display ad creative 524, where a particular ad is displayed. The display ad creative may be a red themed display ad 526, an orange themed display ad 528, a blue themed display ad 530, a purple themed display ad 532, or a yellow themed display ad 534. For each display ad creative 524, a corresponding number of events is shown. Finally, the last event in the journey occurs at a particular POS store location 536. This may correspond to a conversion—the visitor purchasing something in-store. 38 events occurred in San Francisco 538, 33 events occurred in Atlanta 540, 18 events occurred in New York City 542, 16 events occurred in Salt Lake City 544, and 2 events occurred in Las Vegas 546.

Accordingly, based on the various parameters configured via the interface views illustrated in FIGS. 2A-4, the analysis interface view 500 of FIG. 5 shows a tailored path over time across channels, and can allow a user to gain insights into what paths led to a conversion event and how. This can help increase the conversion events—for example, the user may determine (or the event analytics system may determine) that a particular color ad theme led to increased conversions in a particular area. Accordingly, that color ad theme may be displayed more frequently in that location, which may increase sales.

Examples of Operations for Real-Time Interactive Event Analytics

Figure 6:
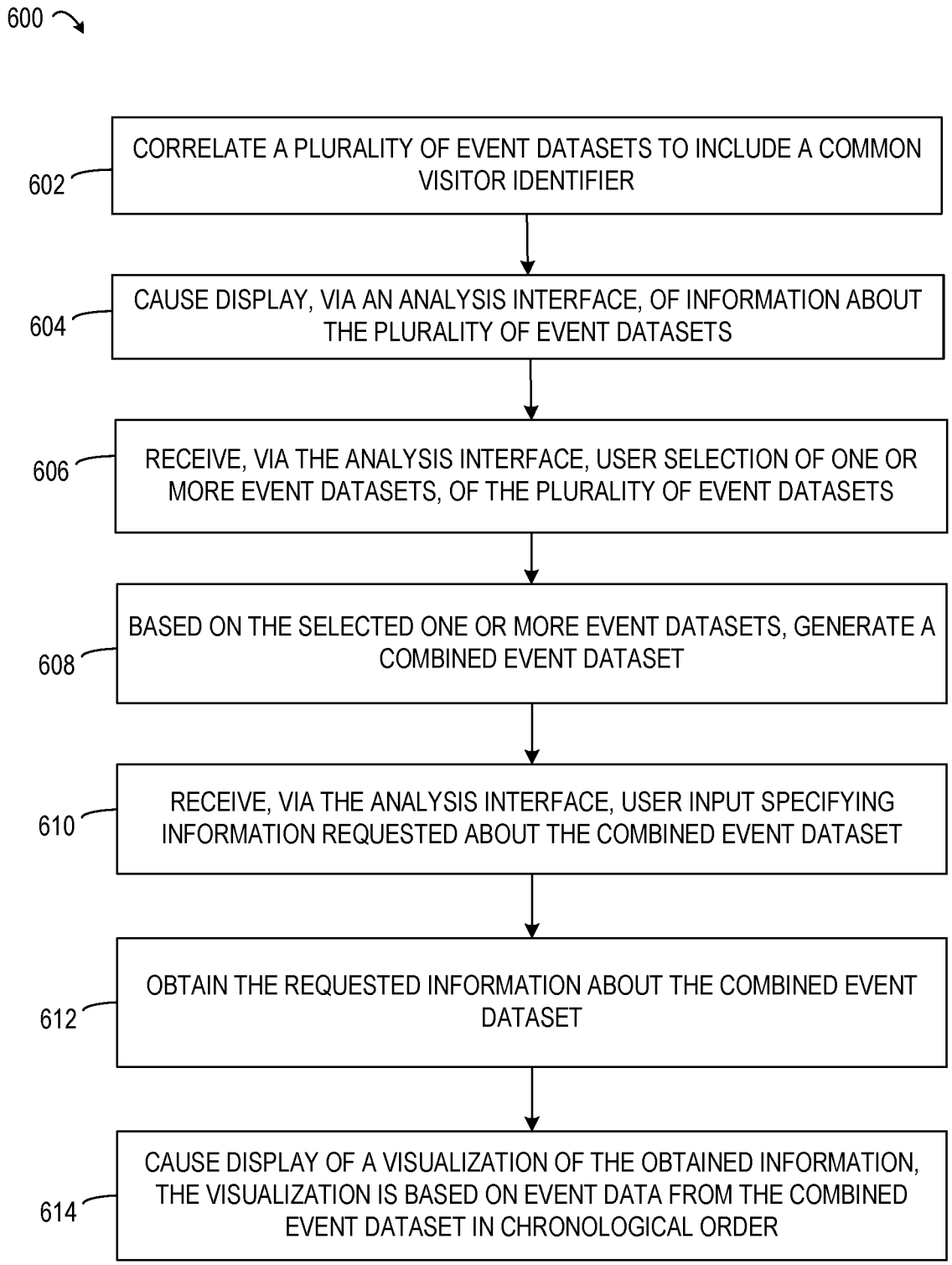
FIG. 6 depicts a flowchart of a method for real-time interactive event analytics, according to certain embodiments of the present disclosure.

FIG. 6 depicts an example of a process 600 for real-time interactive event analytics, according to certain embodiments of the present disclosure. The processing depicted in FIG. 6 may be implemented in software only (e.g., code, instructions, program) executed by one or more processing units (e.g., processors, cores) of the respective systems, in hardware, or combinations thereof. The software may be stored on a non-transitory storage medium (e.g., on a memory device). The method presented in FIG. 6 and described below is intended to be illustrative and non-limiting. Although FIG. 6 depicts the various processing steps occurring in a particular sequence or order, this is not intended to be limiting. In certain alternative embodiments, the steps may be performed in some different order or some steps may also be performed in parallel. In certain embodiments, the processing depicted in FIG. 6 may be performed by the event analytics system 110 in cooperation with other devices as illustrated in FIG. 1.

Prior to the processing depicted in FIG. 6, the event analytics system may gather event data from various sources. Gathering the event data may include identifying event data for events associated with a visitor. The event data for each event may include a timestamp and a device identifier. The event data may further include additional elements, such as a website identifier, location information, or any other suitable information. As a specific example, the event analytics system retrieves a first event dataset corresponding to visitor browser activity (e.g., web traffic data). The event analytics system retrieves a second event dataset, of the plurality of event datasets, corresponding to visitor activity from one or more of a telephone interaction, an in-person interaction, or an internet of things device interaction. Accordingly, the event analytics system may incorporate cross channel data from a variety of sources, both online (e.g., visitor browser activity data) and offline (e.g., from an in-person interaction).

Identifying the event data may include retrieving event data from a user device and/or a resource provider device. Alternatively, or additionally, identifying the event data may include generating event data. For example, the event analytics system may retrieve browsing data from a user device and generate a timestamp indicating a time at which the browsing data was retrieved.

The event analytics system may generate and store an event dataset including the event data. The event analytics system may store a set of timestamps, a set of device identifiers, and/or other data elements in association with one another to produce the event dataset. The event analytics system may, for example, generate the event dataset by storing each event data element to an entry in a data table. Some event data collected may be anonymous (e.g., not include a visitor identifier). Some event data may include a visitor identifier.

In some embodiments, the event analytics system may periodically or continually retrieve event data from sources such as a resource provider system. The event analytics system may, for example, retrieve event data from a resource provider system via an application programming interface (API), and store the event data to an event dataset on the event analytics system. As another example, the event analytics system may provide interface elements that a resource provider administrator can use to upload event data (e.g., as a comma-separated values (CSV) file) for storage on the event analytics system. As another example, the event data system may point to a resource provider system data platform or data lake which stores one or more event datasets. In this case, the event analytics system may analyze data stored remotely on the resource provider system (e.g., via a streaming connection). As yet another example, devices such as in-store beacons may transmit event data to the event analytics system, which may be stored to an event dataset on the event analytics system.

At step 602, the event analytics system correlates a plurality of event datasets to include a common visitor identifier. The event analytics system may store and/or access a great deal of event data associated with various visitors. Some of the event data associated with a particular visitor may include different types of identifiers such as visitor names, cookie identifiers, IP addresses, CRM identifiers, and so forth. The event analytics system may perform operations to correlate such disparate event datasets with the appropriate visitor using a determined identifier, such as a cookie identifier or cross-channel visitor identifier.

In some embodiments, the event analytics system identifies schema of the different event datasets. The identified schema may establish the meaning of fields within the event datasets. For example, web data stored to the event analytics system may include a device identifier field (e.g., for cookie identifiers) and a timestamp field, while CRM data stored to a data lake on the resource provider system may include a CRM identifier field and a timestamp field. The event analytics system may further perform format conversions to make such disparate datasets compatible with one another.

The event analytics system may perform visitor stitching to correlate data, which may be from multiple datasets having different schema, with a particular visitor. The event analytics system may determine a common element identifying a visitor (e.g., a cookie identifier) in two or more event data elements, and stitch or append a visitor identifier (e.g., a cross-channel visitor identifier) to associated event data elements. As an example, a first event dataset, of the plurality of event datasets, includes timestamps and a cookie identifier. A second event dataset, of the plurality of event datasets, includes timestamps and a visitor identifier that is not a cookie identifier. The event analytics system correlates the first event dataset and the second event dataset by appending the visitor identifier to the first event dataset.

In some embodiments, the event analytics system event analytics system performs visitor stitching by generating an identity mapping that maps the device identifier to the visitor identifier. The event analytics system may store the identity mapping. The event analytics system may generate the identity mapping by storing the device identifier in association with the visitor identifier (e.g., as a data table or using a pointer). The identity mapping may further include a timestamp indicating a time at which the relationship between the visitor identifier and the device identifier was discovered.

In some embodiments, the event analytics system may generate the identity mapping by querying the event dataset. The event dataset is scanned either in its entirety, or back to a suitable time frame to limit the computational effort needed to create the identity mapping. Events may be filtered where the device identifier and the visitor identifier are present (a.k.a. authenticated rows). The event analytics system may group the event dataset by the device identifier, and then check to see if the visitor identifier is a new assignment (no previous rows), the same assignment (preceded by rows with the same visitor identifier), or a change in assignment (the immediately preceding row has a different visitor identifier). In the cases of a new or changed assignment, a new identity mapping is recorded, along with the event timestamp of the row, forming a tuple of (timestamp, device identifier, visitor identifier). This process may be repeated for a set of stored device identifiers, and new mappings may be saved to a new identity mapping dataset. In some embodiments, the identity mapping datasets are partitioned by time.

The event analytics system may use the generated identity mapping to update the event dataset based on the identity mapping and a predetermined look-back window. The event analytics system may update the event dataset by adding the visitor identifier to the event dataset (e.g., by adding or modifying fields in the event dataset). In some embodiments, the event analytics system adds the visitor identifier to the event dataset by performing a left join of the identity mapping and the event dataset. Alternatively, or additionally, preexisting fields of the event dataset may be modified to include the visitor identifier in the identity mapping.

At step 604, the event analytics system causes display, via the analysis interface, of information about the plurality of event datasets. The event management system may provide instructions to the analysis interface for information to display and how to format the information. The event management system thereby causes the resource provider system to display the information via the analysis interface (e.g., on a display component of the resource provider system). The analysis interface may present lists of datasets, information about the datasets and information therein, and the like, as illustrated in FIGS. 2A-2C. For example, responsive to instructions received from the event analytics system, the analysis interface lists a set of event datasets on a left sidebar. The analysis interface may further be configured to accept user input selecting event datasets and/or requesting additional information about event datasets, as described above with respect to FIGS. 2A-2C.

At step 606, the event analytics system receives, via the analysis interface, user selection of one or more event datasets, of the plurality of event datasets. As illustrated in FIG. 2A, the analysis interface may display a list of event datasets, along with interface elements for receiving user input to select one or more of the event datasets in the list. For example, the analytics interface may receive user input selecting a checkbox next to the name of an event dataset, or receive user input dragging and dropping an event dataset to an area labeled "add datasets," as illustrated in FIG. 2A. Responsive to receiving such user input, a signal may be transmitted to the event analytics system indicating one or more selected event datasets. In some embodiments, the user input may specify additional information such as a keying parameter, as shown in FIG. 2C.

At step 608, the event analytics system generates a combined event dataset based on the selected one or more event datasets. The event analytics system merges data from each of the event datasets selected at step 608. The event analytics system may use timestamps for each element of event data to combine the event datasets in chronological order. In some embodiments, the event datasets may include different fields, in which case the event analytics system may generate additional columns for the combined event dataset.

In some embodiments, the event analytics system receives user input configuring parameters for the combined event dataset. For example, the event analytics system receives, via the analytics interface, a user-configured keying parameter (e.g., a type of identifier for use in stitching the event data). Responsive to user selection of the type of identifier for the stitching, the event analytics system may re-key the event dataset by stitching a new identifier type across event data, as described above with respect to step 602. For example, initial stitching may be performed based on a cookie identifier at step 602. Subsequent to receiving user selection of user identifier as a new keying parameter at step 608, the event analytics system may re-execute the keying operations to stitch a visitor identifier across event data.

Other examples of user-provided parameters for configuring the combined event dataset include filters, session settings, time-zone settings, and component curation. User input may be received to filter event data to certain visitor segments, time periods (e.g., to analyze data in a particular month), and so forth. User input may be received to convert times to a certain time zone. Responsive to such user input, the event analytics system may perform operations on the combined event dataset. For example, responsive to user input selecting demographic information to filter to female visitors with ages between 21 and 34, the event analytics system identifies and selects event data corresponding to the selected demographic. The combined event dataset may then be restricted to a subset corresponding to the selected demographic. As another example, responsive to user input selecting a time zone, the event analytics system performs calculations to convert time entries in the combined event dataset to the selected time zone.

In some embodiments, upon applying the user-configured parameters to the combined event dataset, the event analytics system causes display, via the analysis interface, of the combined event dataset with the parameter configurations applied. For example, upon receiving a set of user-configured parameters, as shown in FIG. 3B, the analysis interface transitions to a view that displays event data with the filters applied.

At step 610, the event analytics system receives, via the analysis interface, user input specifying information requested about the combined event dataset. Such user input may be accepted via an interface as illustrated in FIG. 4. Via such an interface, the event analytics system may accept user input specifying information requested. For example, a user my drag and drop a segment (e.g., to field 418 of FIG. 4) for further analysis of that segment. As another example, the user may select a question from a drop-down menu, or type in a question (e.g., "What percentage of visitors bought something in-store?" or "What is the unsubscribe rate after viewing Advertisement X in an email?").

At step 612, the event analytics system obtains the requested information about the combined event dataset. For example, the user input may request customer journey information for a particular segment of visitors. The event analytics system may prepare and execute a query on the combined event dataset to obtain the requested information. The event analytics system may apply filters to select data corresponding to a subset of visitors (e.g., in-store purchasers, visitors using a particular operating system, and/or the like). The event analytics system may, as a specific example, prepare and execute an SQL query to identify events that occurred after visitors both called in to a call center to complain and viewed a particular web page.

In some embodiments, the event analytics system may apply a predictive machine-learning algorithm to the combined event dataset to generate a predicted action by a visitor associated with the visitor identifier. For example, the event analytics system may use a model trained on a set of historical event data to predict events such as a purchase event, a visitor unsubscribing from a mailing list, and so forth. Such a model may take into account characteristics of a particular visitor or segment of visitors, events associated with a particular visitor or segments of visitors (and the order of the events), and so forth.

At step 614, the event analytics system causes display, via the analysis interface, of a visualization of the obtained information. The visualization is based on event data from the combined event dataset in chronological order. The visualization may be similar to that shown in FIG. 5, wherein a set of events is shown in chronological order for a set of visitors, showing how the events evolved into a customer journey.

The event management system may provide data for display of the visualization to the resource provider system. The event management system thereby causes the resource provider system to display the visualization, via the analysis interface, on a display component of the resource provider system. In some embodiments, the event analytics system may generate the visualization—for example, by generating instructions for rendering a chart or graph illustrating a set of event data in chronological order. The event analytics system may provide information for display of the visualization of the device graph to the resource provider computer. For example, the event analytics system transmits the instructions for rendering the visualization to the resource provider computer over a network.

In some embodiments, the event analytics system may cause display of additional information via the analysis interface. If the event analytics system determined a predicted action, then the event analytics system may cause display, via the analysis interface, of an indication of the predicted action. The event analytics system may transmit a signal to the resource provider system, thereby causing the resource provider system to display the analysis interface with an indication of the predicted action. The indication may be, for example, text such as "Visitor churn likely!" or "Visitor likely to make in-store purchase." The indication may be displayed as a modal and/or in an eye-catching color such as red to draw the user's eye towards the indication.

In some embodiments, the event analytics system may determine an appropriate action. For example, calling a visitor or set of visitors, emailing coupons or advertisements to a visitor or set of visitors, and other actions, may be deemed appropriate based on event data associated with the visitor(s). This may be determined, for example, using a machine learning model or other algorithm to determine that the action is likely to lead to a positive result (such as a sale or navigation to a web page) or prevent a negative result (such as an unsubscribe or other loss of loyalty). Upon determining an appropriate action, the event analytics system may transmit a signal which results in execution of the determined action. Examples of such signals include—sending a notification to a call center operator thereby causing the call center operator to call one or more specified visitors, transmitting an email to a visitor, and serving an advertisement to a visitor.

Example of a Computing System for Real-Time Interactive Event Analytics

Any suitable computing system or group of computing systems can be used for performing the operations described herein. For example, FIG. 7 depicts examples of a computing system 700 (which may be substantially similar to the event analytics system 110 of FIG. 1) that executes an integration module 112, a personalization module 114, and a query module 116. In some embodiments, the computing system 700 also executes a reporting module 118, as depicted in FIG. 7. In other embodiments, a separate computing system having devices similar to those depicted in FIG. 7 (e.g., a processor, a memory, etc.) executes the reporting module 118.

The depicted examples of a computing system 700 includes a processor 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device.

The memory device 704 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 700 may also include a number of external or internal devices, such as input or output devices. For example, the computing system 700 is shown with one or more input/output ("I/O") interfaces 708. An I/O interface 708 can receive input from input devices or provide output to output devices. One or more buses 706 are also included in the computing system 700. The bus 706 communicatively couples one or more components of a respective one of the computing system 700.

The computing system 700 executes program code that configures the processor 702 to perform one or more of the operations described herein. The program code includes, for example, the integration module 112, the personalization module 114, the query module 116, the reporting module 118, or other suitable applications that perform one or more operations described herein. The program code may be resident in the memory device 704 or any suitable computer-readable medium and may be executed by the processor 702 or any other suitable processor. The memory 704 may further store event data 120A-120C. In some embodiments, the integration module 112, the personalization module 114, the query module 116, the reporting module 118, and the event data 120A-120C are stored in the memory device 704, as depicted in FIG. 7. In additional or alternative embodiments, one or more of integration module 112, the personalization module 114, the query module 116, the reporting module 118, and the event data 120A-120C are stored in different memory devices of different computing systems. In additional or alternative embodiments, the program code described above is stored in one or more other memory devices accessible via a data network.

The computing system 700 can access one or more of the event data 120A-120C in any suitable manner. In some embodiments, some or all of one or more of these datasets, models, and functions are stored in the memory device 704, as in the example depicted in FIG. 7. For example, a computing system 700 that executes the event management module 111 can provide access to the event data 120A-120C by external systems that execute the reporting module 118.

In additional or alternative embodiments, one or more of these datasets, models, and functions are stored in the same memory device (e.g., memory 704). For example, a common computing system, such as the event analytics system 110 depicted in FIG. 1, can host the integration module 112, the personalization module 114, the query module 116, the reporting module 118, and the event data 120A-120C. In additional or alternative embodiments, one or more of the programs, datasets, models, and functions described herein are stored in one or more other memory devices accessible via a data network.

The computing system 700 also includes a network interface device 710. The network interface device 710 includes any device or group of devices suitable for establishing a wired or wireless data connection to one or more data networks. Non-limiting examples of the network interface device 710 include an Ethernet network adapter, a modem, and the like. The computing system 700 is able to communicate with one or more other computing devices (e.g., a resource provider system 104, as shown in FIG. 1) via a data network using the network interface device 710.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A computer-implemented method comprising:
   correlating, by an event analytics system, a plurality of event datasets to include a common visitor identifier for a visitor;
   causing display, by the event analytics system via an analysis interface, of information about the plurality of event datasets;
   receiving, by the event analytics system via the analysis interface, user selection of two event datasets, of the plurality of event datasets, the two event datasets comprising a first event data set including browser activity of the visitor and a second event data set corresponding to activity of the visitor from one or more of a telephone interaction, an in-person interaction, or an internet of things device interaction;
   based on the selected two event datasets, generating, by the event analytics system, a combined event dataset;
   receiving, by the event analytics system via the analysis interface, user input specifying information requested about the combined event dataset;
   obtaining, by the event analytics system, the requested information about the combined event dataset; and
   causing display, by the event analytics system via the analysis interface, of a visualization of the obtained information, wherein the visualization is based on event data from the combined event dataset in chronological order to show cross-channel activity of the visitor over time.

2. The method of claim 1, further comprising: receiving, via the analysis interface, user input configuring parameters in the combined event dataset; applying, by the event analytics system, the parameter configurations to the combined event dataset; and causing display, by the event analytics system via the analysis interface, of information about the combined event dataset with the parameter configurations applied.

3. The method of claim 1, further comprising: based on the obtained information, determining, by the event analytics system, an appropriate action; and transmitting, by the event analytics system, a signal which results in execution of the determined action.

4. The method of claim 1, further comprising: applying, by the event analytics system, a predictive machine-learning algorithm to the combined event dataset to generate a predicted action by a visitor associated with the visitor identifier; and causing display, by the event analytics system via the analysis interface, of an indication of the predicted action.

5. The method of claim 1, wherein: a first event dataset, of the plurality of event datasets, includes timestamps and a cookie identifier; a second event dataset, of the plurality of event datasets, includes timestamps and a visitor identifier that is not a cookie identifier; and the event analytics system correlates the first event dataset and the second event dataset by appending the visitor identifier to the first event dataset.

6. The method of claim 1, further comprising: receiving, by the event analytics system via the analysis interface, user input specifying a type of visitor identifier; and the event analytics system uses the type of visitor identifier as the common visitor identifier to correlate the event datasets.

7. The method of claim 1, further comprising: retrieving, by the event analytics system, a first event dataset, of the plurality of event datasets, corresponding to visitor browser activity; and retrieving, by the event analytics system, a second event dataset, of the plurality of event datasets, corresponding to visitor activity from one or more of a telephone interaction, an in-person interaction, or an internet of things device interaction.

8. A computing system comprising a processor and a non-transitory computer-readable medium coupled to the processor, the non-transitory computer-readable medium including instructions which, when executed by the processor, cause performance of a method comprising:
- correlating a plurality of event datasets to include a common visitor identifier for a visitor;
- causing display, via an analysis interface, of information about the plurality of event datasets;
- receiving, via the analysis interface, user selection of two event datasets, of the plurality of event datasets, the two event datasets comprising a first event data set including browser activity of the visitor and a second event data set corresponding to activity of the visitor from one or more of a telephone interaction, an in-person interaction, or an internet of things device interaction;
- based on the selected two event datasets, generating a combined event dataset;
- receiving, via the analysis interface, user input specifying information requested about the combined event dataset;
- obtaining the requested information about the combined event dataset; and
- causing display, via the analysis interface, of a visualization of the obtained information, wherein the visualization is based on event data from the combined event dataset in chronological order to show cross-channel activity of the visitor over time.

9. The system of claim 8, the method further comprising: receiving user input configuring parameters in the combined event dataset; applying the parameter configurations to the combined event dataset; and causing display, via the analysis interface, of information about the combined event dataset with the parameter configurations applied.

10. The system of claim 8, the method further comprising: based on the obtained information, determining an appropriate action; and transmitting a signal which results in execution of the determined action.

11. The system of claim 8, the method further comprising: applying a predictive machine-learning algorithm to the combined event dataset to generate a predicted action by a visitor associated with the visitor identifier; and causing display, via the analysis interface, of an indication of the predicted action.

12. The system of claim 8, wherein: a first event dataset, of the plurality of event datasets, includes timestamps and a cookie identifier; a second event dataset, of the plurality of event datasets, includes timestamps and a visitor identifier that is not a cookie identifier; and the system correlates the first event dataset and the second event dataset by appending the visitor identifier to the first event dataset.

13. The system of claim 8, the method further comprising: receiving, via the analysis interface, user input specifying a type of visitor identifier; and using the type of visitor identifier as the common visitor identifier to correlate the event datasets.

14. The system of claim 8, the method further comprising: retrieving a first event dataset, of the plurality of event datasets, corresponding to visitor browser activity; and retrieving a second event dataset, of the plurality of event datasets, corresponding to visitor activity from one or more of a telephone interaction, an in-person interaction, or an internet of things device interaction.

15. A non-transitory computer-readable medium having instructions stored thereon, the instructions executable by a processing device to perform a method comprising:
- correlating a plurality of event datasets to include a common visitor identifier for a visitor;
- causing display, via an analysis interface, of information about the plurality of event datasets;
- receiving, via the analysis interface, user selection of two event datasets, of the plurality of event datasets, the two event datasets comprising a first event data set including browser activity of the visitor and a second event data set corresponding to activity of the visitor from one or more of a telephone interaction, an in-person interaction, or an internet of things device interaction;
- based on the selected two event datasets, generating a combined event dataset;
- receiving, via the analysis interface, user input specifying information requested about the combined event dataset;
- obtaining the requested information about the combined event dataset; and
- causing display, via the analysis interface, a visualization of the obtained information, wherein the visualization is based on event data from the combined event dataset in chronological order to show cross-channel activity of the visitor over time.

16. The non-transitory computer-readable medium of claim 15, the method further comprising: receiving, via the analysis interface, user input configuring parameters in the combined event dataset; applying the parameter configurations to the combined event dataset; and causing display, via the analysis interface, of the combined event dataset with the parameter configurations applied.

17. The non-transitory computer-readable medium of claim 15, the method further comprising: based on the obtained information, determining an appropriate action; and transmitting a signal which results in execution of the determined action.

18. The non-transitory computer-readable medium of claim 15, the method further comprising: applying a predictive machine-learning algorithm to the combined event dataset to generate a predicted action by a visitor associated with the visitor identifier; and causing display, via the analysis interface, of an indication of the predicted action.

19. The non-transitory computer-readable medium of claim 15, wherein: a first event dataset, of the plurality of event datasets, includes timestamps and a cookie identifier; a second event dataset, of the plurality of event datasets, includes timestamps and a visitor identifier that is not a cookie identifier; and the first event dataset and the second event dataset are correlated by appending the visitor identifier to the first event dataset.

20. The non-transitory computer-readable medium of claim 15, the method further comprising: receiving, via the analysis interface, user input specifying a type of visitor identifier; and using the type of visitor identifier as the common visitor identifier to correlate the event datasets.

* * * * *